Figures 1, 5:
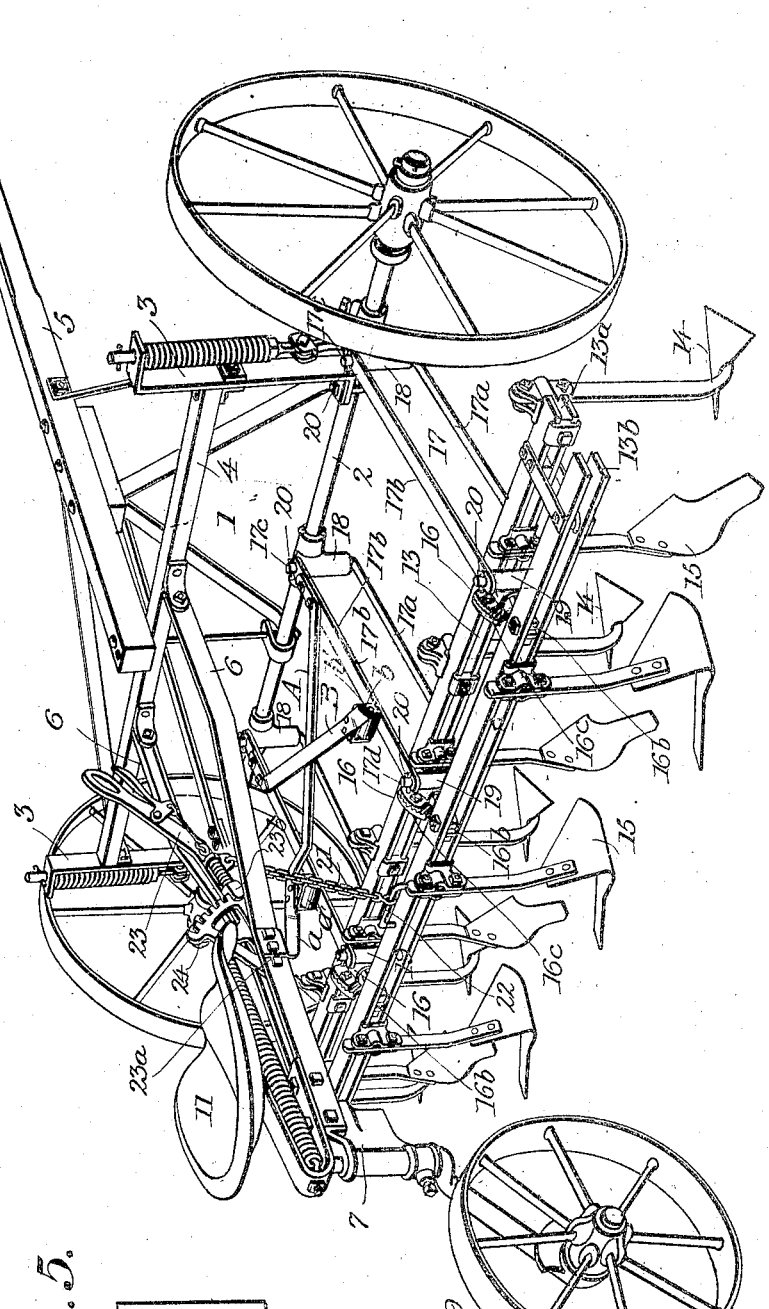

No. 828,615.

PATENTED AUG. 14, 1906.

A. LINDGREN.
CULTIVATOR.
APPLICATION FILED APR. 11, 1906.

2 SHEETS—SHEET 1.

Witnesses
P. F. Barnes.
L. E. Morrison.

Inventor
August Lindgren
By F. Dodge, Attorney

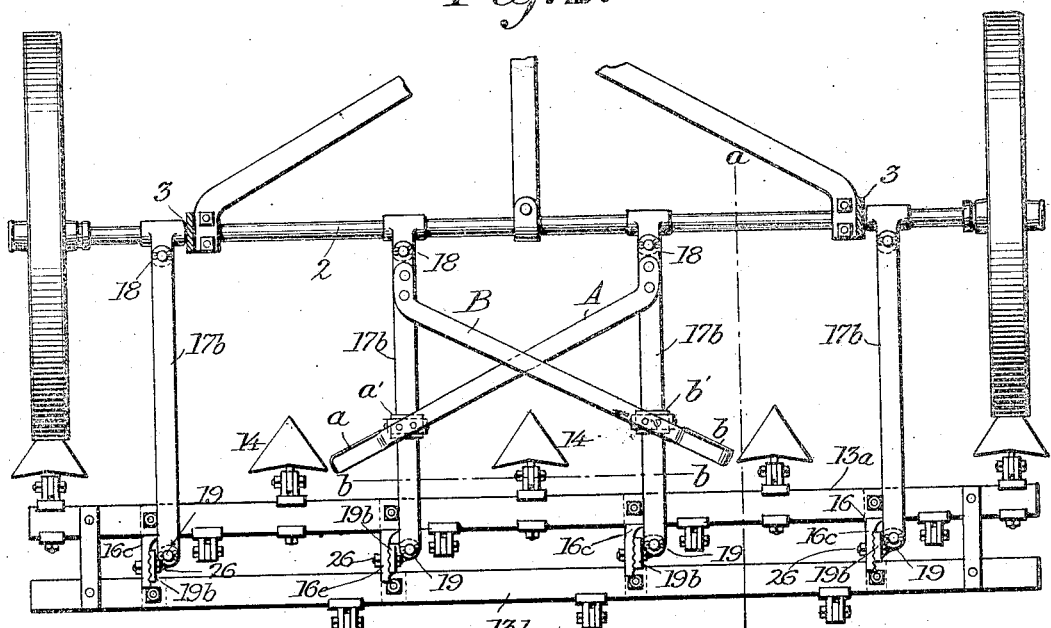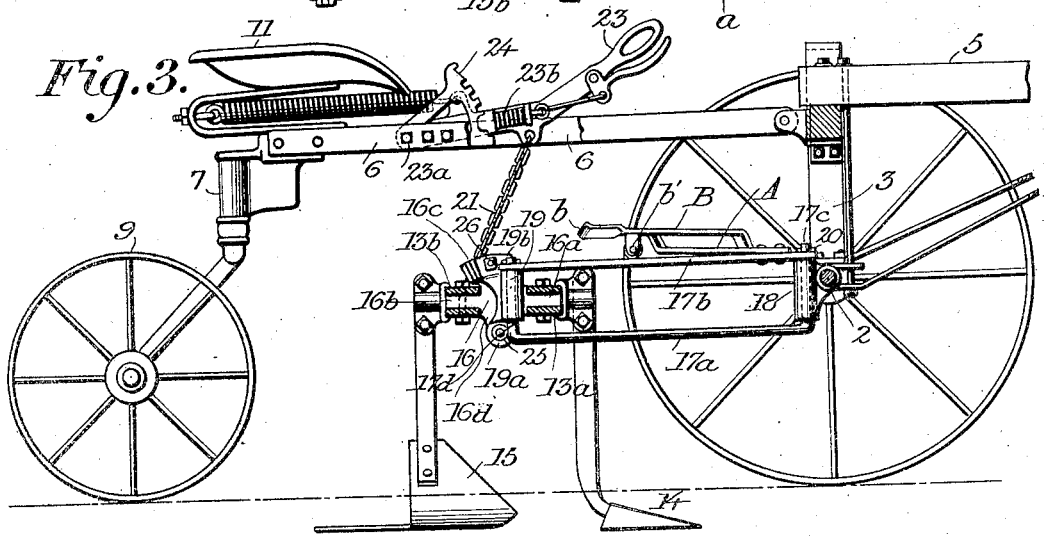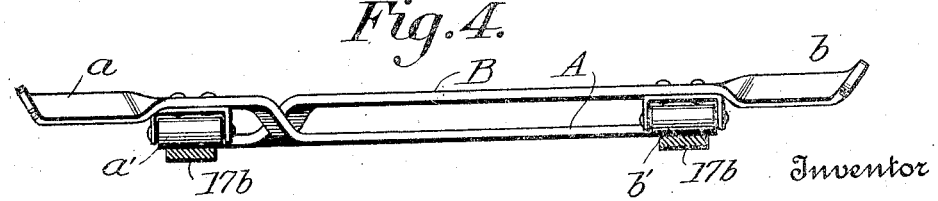

UNITED STATES PATENT OFFICE.

AUGUST LINDGREN, OF MOLINE, ILLINOIS, ASSIGNOR TO MOLINE PLOW COMPANY, A CORPORATION OF ILLINOIS.

CULTIVATOR.

No. 828,615.   Specification of Letters Patent.   Patented Aug. 14, 1906.

Application filed April 11 1906. Serial No. 311,068.

*To all whom it may concern:*

Be it known that I, AUGUST LINDGREN, of Moline, county of Rock Island, and State of Illinois, have invented a new and useful Improvement in Cultivators, of which the following is a specification.

This invention relates to cultivators, and has reference more particularly to the means for controlling by the feet the lateral transverse movements of the cultivator-shovels to the end that they may be made to follow any irregularities in the rows of plants being cultivated.

The invention is designed with special reference for application to machines for cultivating beet-plants, in which machines the cultivating-shovels are set to act very close to the plants, and to avoid injury to them it is necessary that the controlling means be very sensitive in its action and the lateral movements of the shovels respond quickly and instantly to the pressure of the feet.

With this end in view my invention consists in combining with a laterally and freely movable frame equipped with cultivating shovels or blades a foot-lever mechanism of improved form and construction adapted by the action of the driver's feet thereon to control the lateral movements of the frame, whereby the cultivating-blades may be caused to follow accurately irregularities in or deviations of the rows of plants.

In the accompanying drawings I have shown my invention embodied in a machine in which the cultivator-blades are mounted at intervals on a transverse beam sustained by a wheeled frame in such manner that it may swing horizontally in a transverse direction bodily with reference to the frame, such a construction being characteristic of machines for cultivating beet-plants; but it will be understood that the invention is applicable as well to cultivators of other types where the blades are carried by individual drag-bars connected together for lateral movement in unison.

In the accompanying drawings, Figure 1 is a perspective view of a beet-cultivator having my invention embodied therein. Fig. 2 is a top plan view of the same with portions of the frame broken away to expose other parts to view. Fig. 3 is a longitudinal sectional elevation on the line *a a* of Fig. 2. Fig. 4 is a transverse sectional elevation on the line *b b* of Fig. 2. Fig. 5 is a plan view of modified form of my invention.

Referring to the drawings, 1 represents a wheeled frame comprising a supporting-axle 2, sustaining by means of uprights 3 a transverse frame-bar 4, giving support to a tongue 5. Extending rearwardly from the frame-bar 4 are two converging longitudinal frame-bars 6, sustaining at their rear ends a casting 7, having a bearing in which the stem of a caster-wheel 9 is mounted, the caster-wheel thus serving to give guiding support to the wheeled frame at the rear end, at which point the frame is provided with a driver's seat 11.

13 represents a transverse beam arranged beneath and flexibly sustained from the longitudinal frame-bars and in rear of the supporting-axle, which beam is equipped with suitable cultivating devices in the form of shovels 14 and blades 15 to act between the rows of plants. The beam is connected with the axle by drafting devices of such form that it may be moved laterally with reference to the wheeled frame, maintaining at all times a position parallel with the axle, with the result that the driver by actuation of the foot-lever mechanism presently to be described may move the beam laterally and cause the cultivator-blades to follow the rows of plants.

The beam 13 comprises a front bar $13^a$ and a rear bar $13^b$, each of which is formed by two rails arranged one above the other and spaced apart in fixed relations, the cultivator-blades 14, which act at the sides of the rows, having the upper ends of their shanks connected with clips fixed between the rails of the rear bar, while the front bar carries the cultivator-shovels 15, which act midway between the plants to loosen the soil, the upper ends of their shanks being connected with clips seated and secured between the rails of the front bar.

The two bars $13^a$ and $13^b$ of the beam are connected together and maintained in fixed relations by connecting-brackets 16, in the present instance four in number, situated at intervals along the beam, and each formed with front and rear extensions $16^a$ and $16^b$, situated between the rails of the front bar and the rear bar, respectively, and fastened by means of bolts extending through said parts. Between the bars of the beam the brackets are provided with a vertical extension 16ᶜ and with a depending lug 16ᵈ, which extend in a common vertical longitudinal plane.

The draft devices connecting the transverse beam with the axle of the machine are in the form of fore-and-aft parallel extending links 17, four in number, each consisting of a lower U-shaped link 17ᵃ and an upper strap 17ᵇ, the link having its front vertical end 17ᶜ extending upward loosely through and having a bearing in a vertical sleeve 18, mounted loosely on the axle 2, so that it may turn around a horizontal transverse axis, and having its rear vertical end 17ᵈ extending upward through and having a bearing in a vertical sleeve 19, fastened to the connecting-bracket 16, the U-shaped link being confined in its bearing-sleeves by means of cotter-pins or similar fastening devices 20, passed through the extremities of the link, the strap being provided with openings to receive the upper ends of the link and seated on the upper ends of the bearing-sleeves.

From the construction described it will be seen that the beam is connected with the frame of the machine by a system of links constituting a "parallel motion," which, while permitting the beam to be shifted laterally endwise, will maintain it parallel with the axle, with the shovels facing squarely in the direction in the line of draft.

The foot-lever mechanism for controlling the lateral movements of the beam constitutes the main feature of my invention and consists of two horizontal arms A and B, fixed at their front ends to the two fore-and-aft straps 17ᵇ, respectively, of the two adjacent draft devices near the front ends of said straps, whence the arms are extended diagonally rearward in opposite directions and cross each other and have their rear ends arranged each over the other's strap, which rear ends are provided with foot-rests $a$ and $b$ to receive the feet of the driver, by means of which by applying pressure to the rear ends of the arms he is enabled to shift the beam laterally and maintain it under perfect control. To the under sides of the arms, at a point just forward of the foot-rests, there are journaled on horizontal transverse axes friction-rollers $a'$ and $b'$, which as the beam and its fore-and-aft links move laterally bear and travel on the underlying straps, and thus relieve the relatively moving parts of friction and render their movements easy and sensitive.

It will be seen from the construction described that the forward ends of the foot-levers are connected adjacent the pivotal connection of the draft devices with the axle and that their rear ends are arranged to the side of the axis and distant from it, with the foot-rests so disposed that a forward pressure of the driver's feet will apply a lateral strain on the draft devices under a long leverage. I consider the construction by which this result is brought about of great advantage, in that it gives the driver perfect control over the movements of the beam, and by reason of the long leverage and the direct action of the power applied through the foot-rests the beam will respond instantly and with great sensitiveness to the pressure of the feet.

The flexible suspending device for sustaining the beam so that it will be freely movable laterally subject to the controlling action of the foot-lever mechanism is in the form of a chain 21, connected at its lower end to a staple 22 on the beam and having its upper end connected with an adjusting-lever 23, pivoted at its rear end, as at 23ᵃ, between the longitudinal bars of the frame. The lever is provided with a locking-dog 23ᵇ, adapted to coöperate with a segment-plate 24, fixed to the frame-bars, the end of the lever extending in front of the driver's seat, but within easy reach of the driver. By the operation of the lever the beam may be adjusted vertically with reference to the frame and locked in its adjusted position, or for the purposes of transportation the beam may be elevated and held raised in inoperative position.

In order that the inclination of the cultivating devices with reference to the surface of the ground may be varied to regulate the depth of cut, I provide for a bodily adjustment of the transverse beam around a horizontal transverse axis and with reference to the draft-links, so that the points of the blades may be tipped upward or downward or set at intermediate points, according to the conditions to be met. This is effected by the manner of connecting the bearing-sleeves 19 with brackets 16, the sleeves being provided with a depending extension 19ᵃ, seated against the lug 16ᵈ of the bracket and pivotally confined thereon by means of a fastening-bolt 25, which will allow the beam to be tipped or rocked with reference to the bearing-sleeves. The bearing-sleeve is formed with an upward extension 19ᵇ, roughened on its face and seated against the upper extension 16ᶜ of the bracket, which is also roughened on its face and provided with an adjusting-slot, through which is extended a clamping-bolt 26, carried by the extension on the sleeve, the bolt serving to firmly hold the parts together in their adjusted position. By loosening the bolt and shifting the bracket 16 on the lower bolt 25 as an axis the beam may be tilted around the lower bolt, so as to incline the cultivating-blades upward or downward, as the case may be.

In Fig. 5 I have shown my improved foot-lever mechanism applied to a cultivator of the type having individual beams or drag-bars C C, jointed at their forward end to swing laterally and connected together by a transverse link D, so that they move laterally in unison. In a machine of this type the crossed foot-levers or arms A B are applied to the beams which correspond to the draft devices of the beet-cultivator first described, the connecting-link D corresponding to the transverse connecting-beam 13 of the cultivator first described. While in a cultivator of this type with the shovels mounted on the drag-bars the shovels will not stand squarely in the line of draft when the drag-bars are moved laterally, their position will not be such as under certain conditions would interfere materially with their functions. Hence my foot-lever mechanism could be operated to advantage, and my invention is intended to embrace such a use of the mechanism.

Having thus described my invention, what I claim is this:

1. In a cultivator, the combination of a frame, laterally-movable fore-and-aft draft devices jointed at their front ends to the frame to swing laterally, a connection between the draft devices to cause them to move in unison, cultivating devices movable with the draft devices, and arms fixed at their forward ends to the draft devices and extending obliquely rearward and in opposite directions, and adapted by the pressure of the feet to effect the lateral movements of the draft devices.

2. In a cultivator, the combination of a frame, a transversely-extending laterally-movable member or beam, cultivating devices carried by said beam, fore-and-aft draft devices having a jointed connection respectively with said beam and with the frame, and foot-levers connected respectively with the draft devices, and extending therefrom rearwardly toward each other and in opposite directions.

3. In a cultivator, the combination of a frame, a transversely-extending laterally-movable beam, a flexible device suspending said beam from the frame, cultivating devices mounted on the beam, fore-and-aft draft devices having a jointed connection respectively with the beam and with the frame, and foot-levers connected respectively with the draft devices, and extending therefrom rearwardly toward each other and in opposite directions.

4. In a cultivat the combination of a frame, a transversely-extending laterally-movable beam, cultivating devices mounted thereon, fore-and-aft draft devices jointed at their forward ends to the frame, and horizontal arms or foot-levers fixed at their forward ends to the draft devices respectively and extending obliquely rearward in opposite directions and crossing each other and adapted to be operated by the driver's feet.

5. In a cultivator, the combination of a wheeled frame, a transversely-extending laterally-movable beam, cultivating devices thereon, means for suspending said beam from the frame, fore-and-aft links having a jointed connection at their front ends with the frame and a jointed connection at their rear with the beam, an arm connected at its front end near the forward end of one of the draft-links and extending rearward and terminating over the other link, and a second arm connected at its front end near the front end of the latter link and extending rearward and terminating over the companion link, said arms being formed to be acted on by the driver's feet.

6. In a cultivator the combination of a wheeled frame, a transversely-extending laterally-movable beam, cultivating devices on the beam, means for suspending the beam from the frame, fore-and-aft links jointed at their forward ends to the frame and at their rear ends to the beam, horizontal foot-levers fixed at their forward ends to the respective draft-links and extending rearwardly in opposite direction, and each terminating over the other's link, and friction-rollers carried by the levers in position to travel on the underlying links.

7. In a cultivator, the combination of a wheeled frame, a transversely-extending laterally-movable beam, cultivating devices mounted on the beam, vertical bearing-sleeves on the beam, vertical bearing-sleeves carried by the frame, U-shaped links having their vertical ends mounted respectively in said bearing-sleeves, straps engaging the ends of the U-shaped links and seated on the upper ends of the sleeves, means for confining the U-shaped links in their bearings, and horizontal arms or levers fixed at their forward ends respectively to said straps and extending rearward and crossing each other and each terminating over the other's strap.

8. In a cultivator, the combination of a frame, a transversely-extending beam, draft connections jointed at their forward ends to the frame and at their rear ends to the beam, and means for adjusting the beam relatively to the jointed draft connections around a horizontal transverse axis.

9. In a cultivator, the combination of a frame, a transversely-extending beam, cultivating devices mounted on the beam, vertical bearing-sleeves, a connection between the beam and said sleeves formed to permit the beam to be adjusted around a transverse horizontal axis with reference to the sleeves, and draft-links having their rear ends journaled in the sleeves and having their forward ends jointed to the frame.

10. In a cultivator, the combination of a frame, a transverse beam comprising a front and rear bar and intermediate connecting-brackets, cultivating devices mounted on the beam, draft-links having their forward ends jointed to the frame, bearing-sleeves in which the rear ends of the links are mounted, said sleeves being pivoted to the connecting-brackets to permit the latter to be tipped on a transverse axis with reference to the sleeves, and fastening devices for holding the brackets fixedly with relation to the sleeves.

11. In a cultivator, the combination of an axle and ground-wheels, a rearwardly-extending frame, a caster-wheel supporting the rear end of the frame, a driver's seat sustained by the frame at the rear, a transversely-extending beam, cultivating devices on the beam, an adjusting-lever mounted on the frame, a flexible connection between the lever and the beam, fore-and-aft draft-links connected at their front ends to the axle to pivot on a horizontal and a vertical axis, and jointed at their rear ends to the beam, and horizontal arms fixed at their forward ends respectively to the draft-links adjacent their connection with the axle, and extending rearwardly in opposite directions in intersecting paths, with their rear ends within reach of the driver's feet.

In testimony whereof I hereunto set my hand, this 15th day of February, 1906, in the presence of two attesting witnesses.

AUGUST LINDGREN.

Witnesses:
 M. MURPHY,
 J. T. SIMMONS.